No. 813,626. PATENTED FEB. 27, 1906.
F. W. DRAUDT.
CANDY SCREENING MACHINE.
APPLICATION FILED APR. 6, 1905.

2 SHEETS—SHEET 2.

Witnesses
Forrest G. Smith
C. H. Griesbauer

Inventor
Frank W. Draudt
by H. B. Wilson
Attorney

UNITED STATES PATENT OFFICE.

FRANK W. DRAUDT, OF ZION CITY, ILLINOIS.

CANDY-SCREENING MACHINE.

No. 813,626.          Specification of Letters Patent.          Patented Feb. 27, 1906.

Application filed April 6, 1905. Serial No. 254,260.

*To all whom it may concern:*

Be it known that I, FRANK W. DRAUDT, a citizen of the United States, residing at Zion City, in the county of Lake and State of Illinois, have invented certain new and useful Improvements in Candy-Screening Machines; and I do declare the following to be a full, clear, and exact description of the invention, such as will enable others skilled in the art to which it appertains to make and use the same.

My invention is an improved machine for screening candy for the purpose of separating loose sugar and other particles therefrom and to also separate misshapen pieces of candy from the others; and it consists in the construction, combination, and arrangement of devices hereinafter described and claimed.

Figure 1:
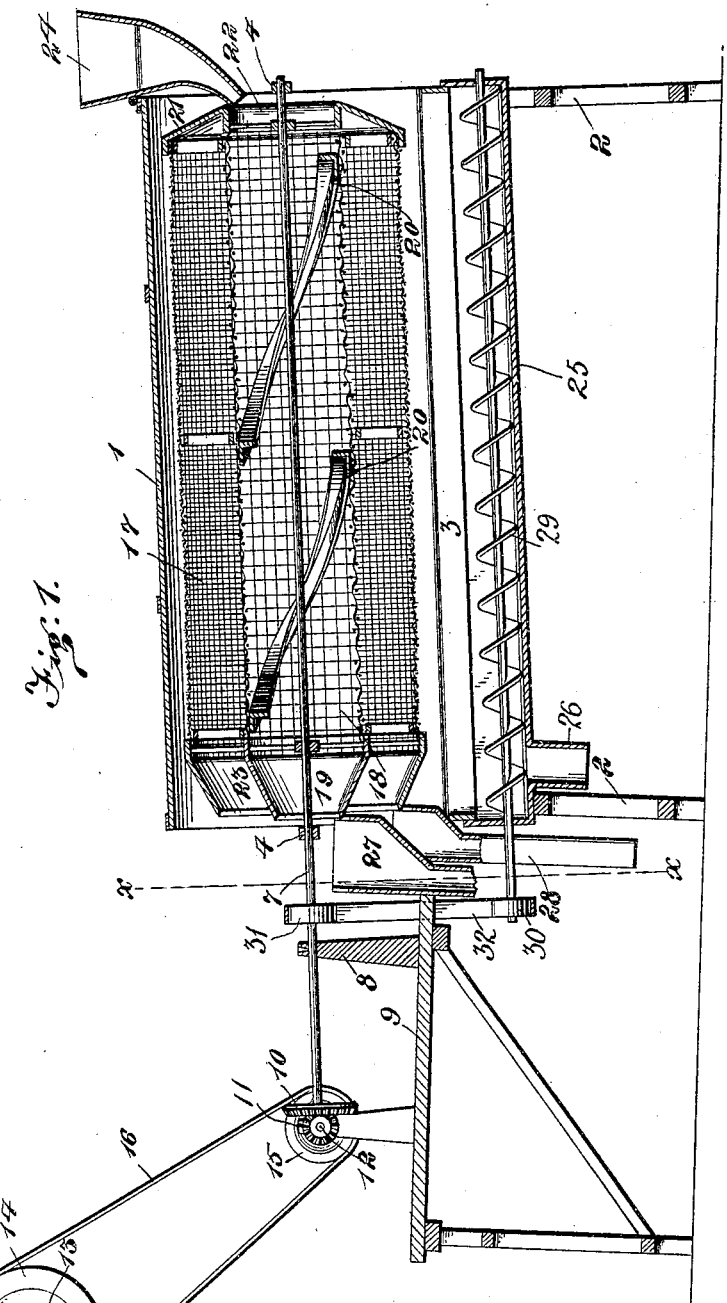
Figure 2:
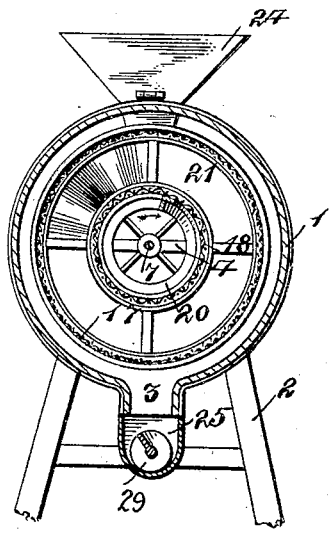
Figure 3:
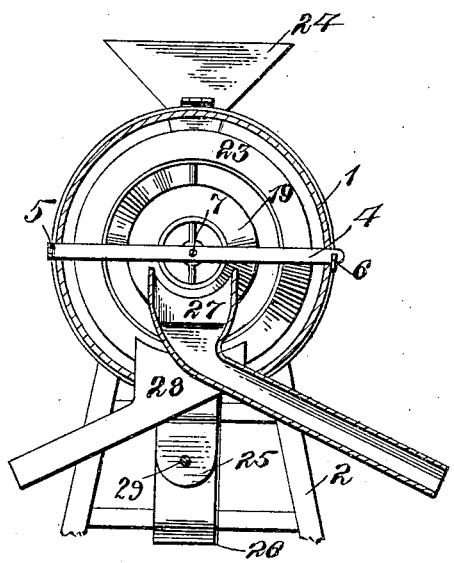

In the accompanying drawings, Figure 1 is a longitudinal sectional view of a candy-screening machine embodying my improvements. Fig. 2 is a transverse sectional view of the same, and Fig. 3 is a similar view taken on the plane indicated by the line *x x* of Fig. 1.

In the embodiment of my invention here shown I employ a cylindrical horizontally-disposed barrel or body 1, which is mounted on suitable supporting-frames 2, is non-revolubly secured thereto, and is provided in its under side with a longitudinal discharge-opening 3. Across the central portion of each open end of the barrel is a bar 4, which is hinged at one end, as at 5, and is provided at its free end with a suitable fastening device 6. An inclined shaft 7 is journaled in suitable bearings in the said bars and is here shown as also journaled in a bearing 8, which is supported by a frame 9. Said shaft has a beveled gear 10, which is engaged by a similar gear 11 on a shaft 12, driven from a counter-shaft 13 by pulleys 14 15, and an endless belt 16. Hence the shaft 7 is rotated. Said shaft carries a pair of longitudinally-inclined concentrically-disposed screens 17 18. The inner screen 18 is of coarser mesh than the outer screen 17, the meshes of the inner screen being of such size as to enable the pieces of candy, such as caramels and the like, of normal size and shape to pass therethrough. The meshes of the outer screen 17, while allowing loose particles of sugar and other matter which may adhere to the pieces of candy to pass therethrough, are too fine to enable the normally sized pieces of candy to pass therethrough. At the discharge end of the inner screen is a discharge cone or spout 19, and the said inner screen is provided on its inner side with spiral blades 20, which serve when the screens are rotated in the direction indicated by the arrow in Fig. 2 to tend to move the contents of the screen toward the upper end thereof; but since the screen 18, together with the screen 17, is longitudinally inclined, so that its discharge end is lowermost, the candy in the inner screen moves downwardly therein, the spiral blades 20 serving to retard the movement of the candy downwardly on the inner screen. The inner screen 18 is provided at its upper feed end with a head 21. The said head also forms a head for the outer screen and is provided with a central feed-opening 22. The outer screen has a head-flange 23 at its lower end. At the feed end of the machine is a hopper 24, which discharges into the feed end of the inner screen. A trough 25 is disposed under the opening 3 of the barrel and is provided at one end with a discharge-spout 26. In the said trough is a conveyer-worm 29, which has a pulley 30. A pulley 31 is on the shaft 7 and is connected to the pulley 30 by an endless belt 32. Hence the conveyer-worm is operated to discharge the sugar and other particles from the trough 25. The inner screen 18 discharges into the spout or trough 27. The outer screen discharges into a trough or spout 28.

In the operation of my invention the candy is discharged into the inner screen by the hopper 24. The inner screen being in rotation, as hereinbefore described, causes the candy to be tumbled, so that the pieces thereof become separated, the normally shaped and sized pieces passing through the meshes of the inner screen, while the misshapen pieces thereof are retained in the inner screen and are finally discharged at 19 into the trough or spout 27. In the outer screen the properly sized and shaped pieces of candy are separated by the action of said screen from the sugar and other particles which may adhere thereto, said particles dropping through the opening 3 into the discharge-trough 25 and the normally sized and shaped pieces of candy being finally discharged from the outer screen into the trough or spout 3.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus described my invention, what I claim as new, and desire to secure by Letters Patent, is—

The herein-described candy-screening machine comprising the fixed inclined cylindrical body having the longitudinal opening in its under side, the trough under said opening, the conveyer-worm in said trough, the hinged bars at the ends of the body, the shaft journaled in bearings in said hinged bars, the inner and outer screens carried and revolved by said shaft, the discharge-spouts for the respective inner and outer screens, at the lower ends thereof, the spiral blades in the inner screen, and the power connections between the shaft and the conveyer-worm whereby said worm is driven by said shaft simultaneously with the screens.

In testimony whereof I have hereunto set my hand in presence of two subscribing witnesses.

FRANK W. DRAUDT.

Witnesses:
  GEO. L. SMITH,
  CHAS. H. IRISH.